INVENTOR.
FRED L. JOHNSTON
BY
Francis T. Burgess
ATTORNEY

March 24, 1959  F. L. JOHNSTON  2,879,055
CUTTING TORCH MOVING AND GUIDING MECHANISM
Filed May 6, 1957  4 Sheets-Sheet 3

INVENTOR.
FRED L. JOHNSTON
BY
Francis T. Burgess
ATTORNEY

March 24, 1959   F. L. JOHNSTON   2,879,055
CUTTING TORCH MOVING AND GUIDING MECHANISM
Filed May 6, 1957   4 Sheets-Sheet 4

INVENTOR.
FRED L. JOHNSTON
BY
Francis T. Burgess
ATTORNEY

United States Patent Office 2,879,055
Patented Mar. 24, 1959

2,879,055

CUTTING TORCH MOVING AND GUIDING MECHANISM

Fred L. Johnston, Belleville, Ill., assignor to General Steel Castings Corporation, Granite City, Ill., a corporation of Delaware Application May 6, 1957, Serial No. 657,240

3 Claims. (Cl. 266—23)

The invention relates to mechanism for automatically moving and guiding a cutting torch or other apparatus along a predetermined curved, or irregular path in accordance with a template.

In the prior art, most flame cutting apparatus of this general type involved the use of a grooved or embossed template, the work being laterally offset from the template, and the template follower and cutting torch being connected by a pantograph or equivalent device so as to transmit movements of the follower to the torch. Such apparatus is usually very complex, and consequently expensive, largely because of the complicated structure required for transmitting movement of the template follower to the torch and is generally suitable only for cutting in a horizontal plane.

It is an object of the invention to provide simplified apparatus for guiding a cutting torch along a predetermined curved, or irregular path.

It is a further object to render unnecessary in apparatus of this type, complex means such as pantographs for guiding the cutting torch.

It is an additional object to provide apparatus of this type in which the template follower constitutes the torch mounting carriage.

It is another object to provide means for holding the torch supporting carriage perpendicular to the template, so that the cut made in the work will always correspond accurately with the template pattern.

It is also an object to provide apparatus of this type in which the torch mounting carriage does not support a driving motor but is driven by an external stationary motor.

I achieve these and more detailed objects, as will appear hereinafter, by utilizing a slotted, rather than a grooved or embossed, template, and supporting the torch on a carriage riding on the side walls of the template slot and retained in fixed angular relation to the plane of the template. In one embodiment the carriage includes a driving gear actuated by a stationary motor associated with the template mounting structure, while in a second embodiment the carriage is pushed or pulled along its path by structure actuated by a stationary motor.

Figure 1:
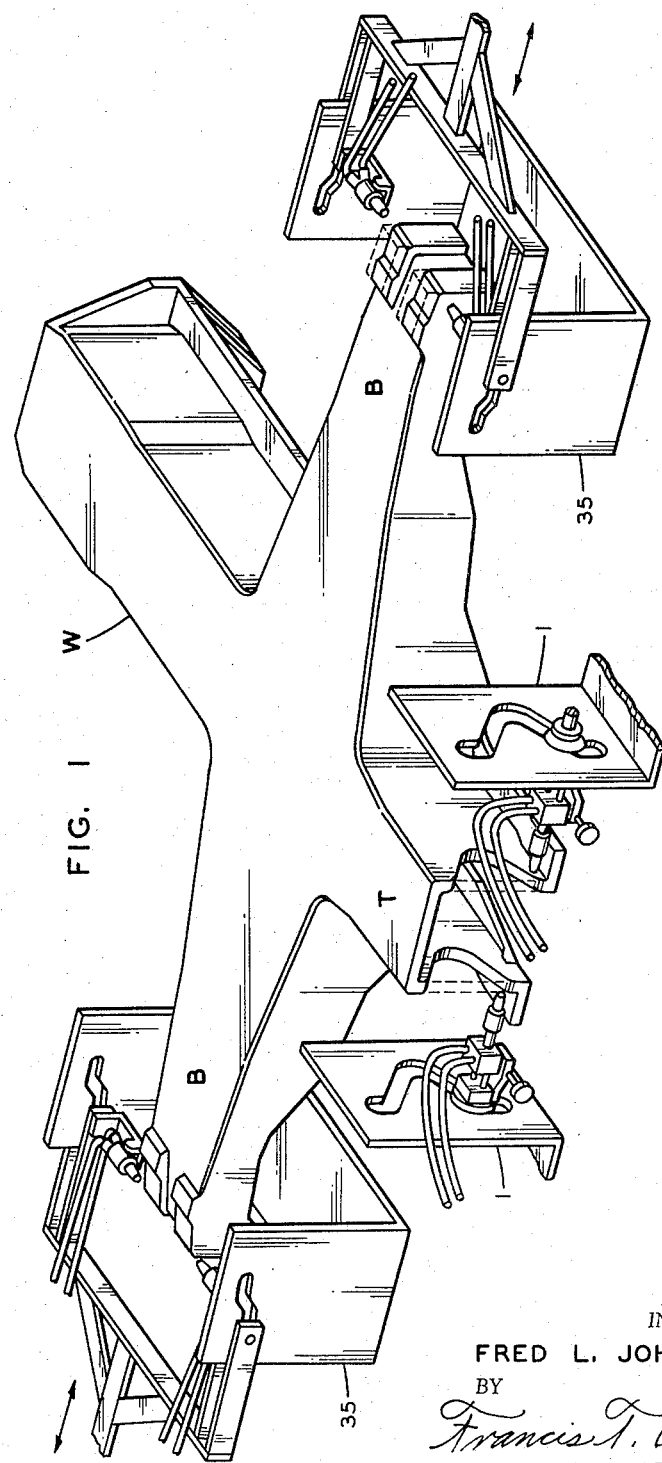
Figure 1 is a perspective view showing embodiments of my invention in operating position with respect to a workpiece.
Figure 2:
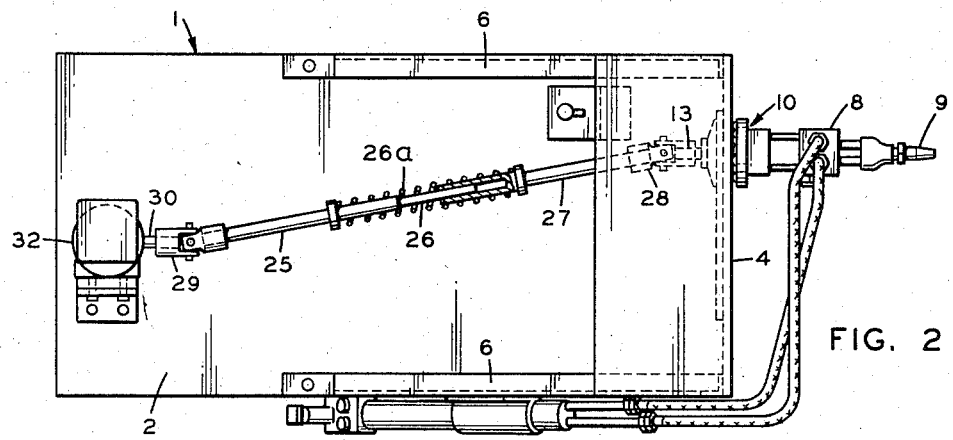
Figure 2 is a top view of one form of my invention.
Figure 3:
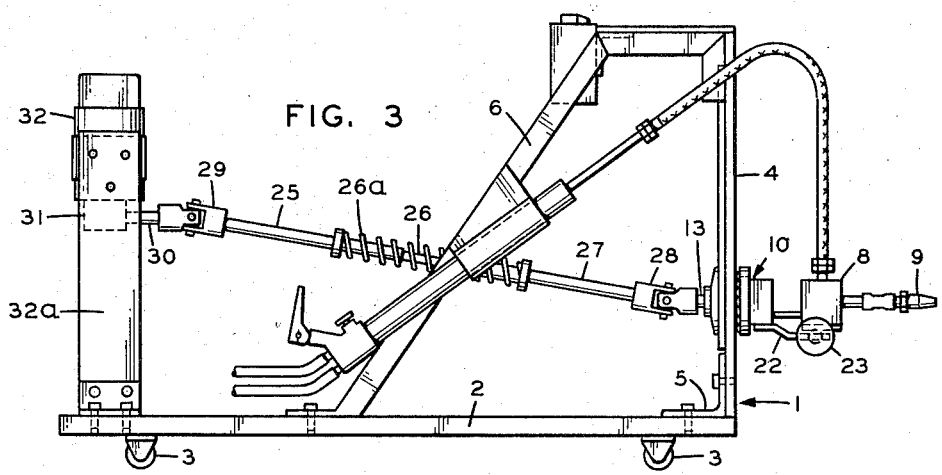
Figure 3 is a side view of the apparatus illustrated in Figure 1.
Figure 4:
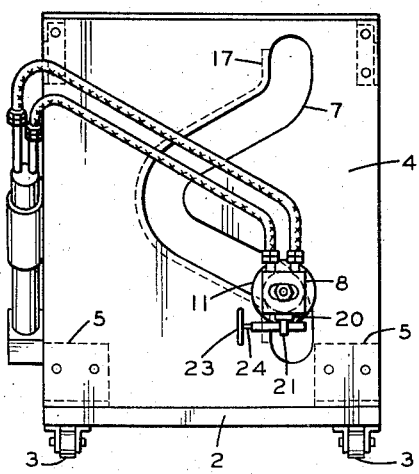
Figure 4 is an end view of the apparatus illustrated in Figures 1 and 2.
Figure 5:
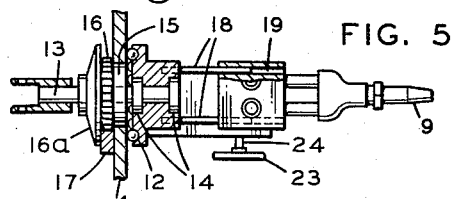
Figure 5 is an enlarged top view of the torch and carriage illustrated in Figures 2–4, partially sectionalized.
Figure 6:
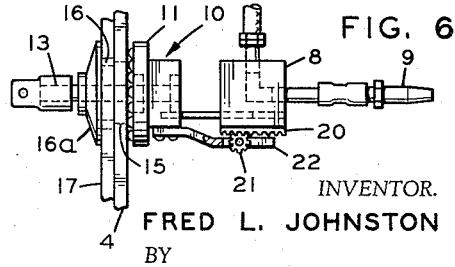
Figure 6 is an enlarged side view of the torch and carriage illustrated in Figures 1 to 4.
Figure 7:
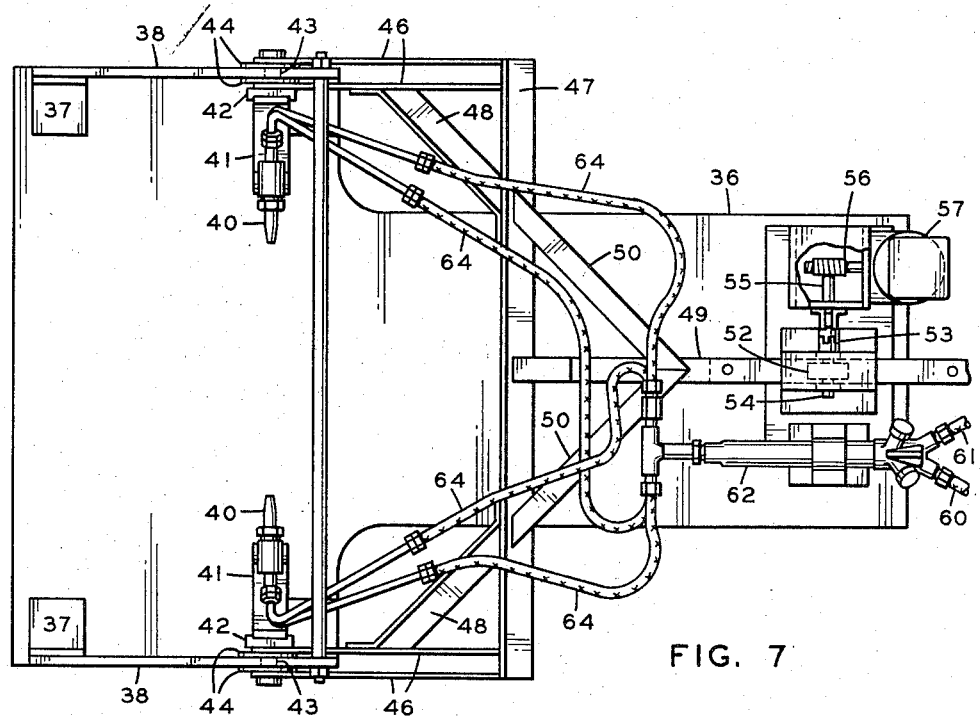
Figure 7 is a top view of a second embodiment of the invention.
Figure 8:
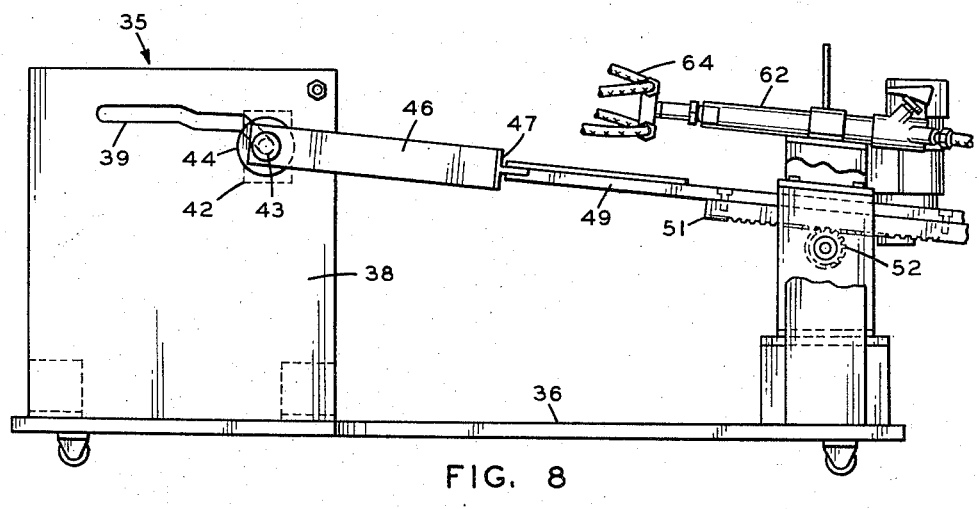
Figure 8 is a side view of the apparatus illustrated in Figure 7.
Figure 9:
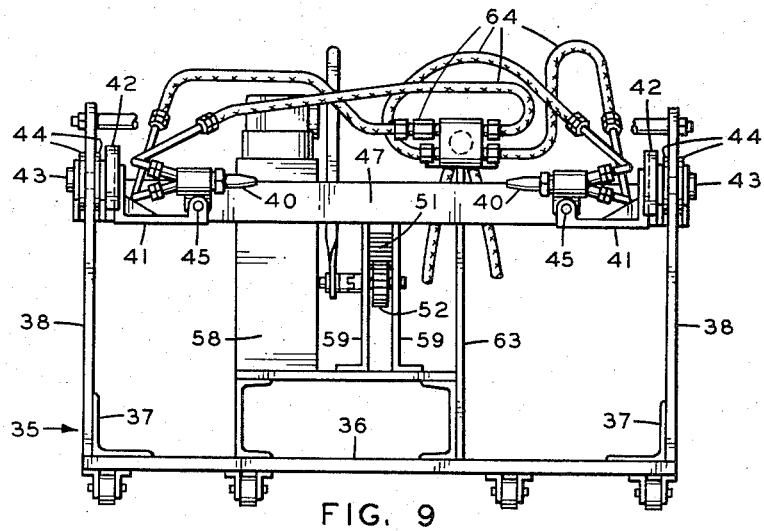
Figure 9 is a view of the cutting end of the apparatus illustrated in Figures 7 and 8.
Figure 10:
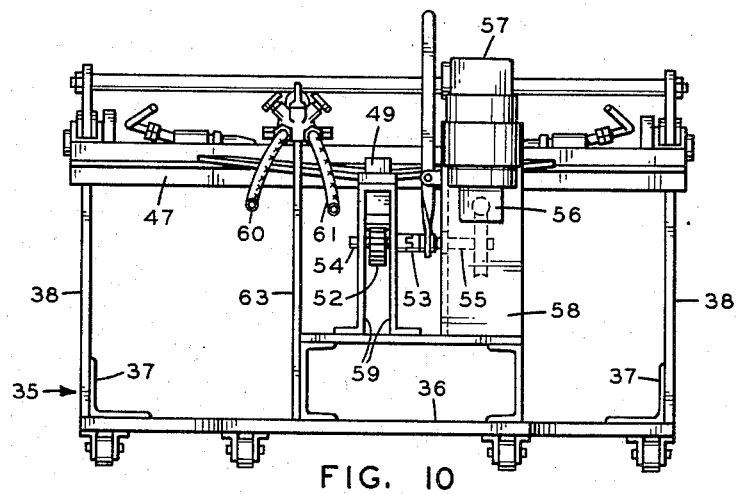
Figure 10 is a view of the driving end of the apparatus illustrated in Figures 7 to 9.

In Figure 1 both embodiments of my invention are positioned in operating location relative to a workpiece consisting of a railway car underframe end casting, generally indicated at W. Casting W includes bolster arms B, and tailpiece T. As cast, the webs of tailpiece T terminate in substantially straight edges and, if the tailpiece is to be butt welded to a fabricated center sill (not shown) of substantially identical cross-section, the strength of the welded joint may be increased in the usual manner by providing substantially V-shaped openings in each of the webs of the tailpiece and matching projections on the ends of the center sill.

The first embodiment of my invention, generally indicated by the numeral 1, is for the purpose of cutting the V-shaped openings in the ends of the tailpiece side walls, although it will be understood that by changing templates it can be used to cut an infinite variety of shapes.

Cutting apparatus 1 (as best seen in Figures 2–6) comprises a base plate 2, preferably mounted on rollers 3 to facilitate moving it toward and away from the work and an upright template 4, secured by means of angle brackets 5, to base plate 2, and suitably braced by a pair of inclined braces 6.

Template 4 is formed with a slot 7, the center line of which conforms in shape to the desired cut to be made on the work, in this instance a V rotated 90 degrees from its normal upright position.

The oxy-acetylene torch, comprising a block-shaped elbow 8 and a burner nozzle 9, is retractably supported on slot-mounted carriage 10. The latter consists of a hat-shaped member 11, the rim portion of which forms a race for ball bearings 12, which are in engagement with the outer surface of template 4 and are provided for the purpose of eliminating friction between the block 11 and the face of the template during movements of the carriage thereover. Drive shaft 13 is rotatably journalled in block 11 and is retained therein by spaced ball bearing assemblies 14. A roller 15 rotatably journalled on shaft 13 supports the carriage on the lower wall of the slot, roller 15 being almost as great in diameter as the width of the slot whereby the carriage will remain substantially centered in the slot when it is moved from the lower to the upper leg of the V and vice versa, even though the roller is supported by the left hand wall of the slot while traversing the upper leg. Adjacent the inside surface of the template, a driving gear 16 is rigidly mounted on the drive shaft 13, and engages a toothed rack 17 which extends along one edge of the slot 7. For retaining the carriage assembly on the template, circular retainer 16a, of greater diameter than the gear 16, is mounted on the shaft adjacent the gear, so as to form, in effect, a peripheral flange on the gear, in slidable engagement with the flat inner surface of the rack.

For supporting the torch on the carriage, carriage member 11 is provided with a pair of cylindrical pins 18 extending in a direction normal to the plane of the template 4. Pins 18 are slidably received in cylindrical recesses 19 in torch elbow block 8, whereby the torch may be extended and retracted relative to the carriage 10. To provide greater accuracy in positioning the torch, a short toothed rack 20 is secured to the bottom of block 8 and engages a pinion 21 journalled on a bracket 22 supported by the carriage 10; the pinion is manually rotatable by means of a handwheel 23 and associated shaft 24.

Rotary motion, for moving the carriage in the slot, is imparted to the driving shaft 13 and thence to gear 16 by a variable-length shaft consisting of shaft 25 with a small diameter extension 26 slidably received within the hollow end portion of shaft 27; extension 26 is keyed against rotation relative to shaft 27, so that rotary movements of shaft 25 are transmitted to shaft 27. The variable-length shaft 25, 26, 27 is connected at one end, by a universal joint 28, to driving shaft 13, and at its other end, by a similar universal joint 29, to the output shaft 30 of a gear box 31 associated with variable speed motor 32 which, with gear box 31, is supported above the base plate 2 by upstanding members 32a, which are secured at their lower ends to base plate 4. Thus, even though a stationary motor is used, variations in distance between it and the carriage, as the latter moves along the template, are accommodated, while at the same time the torque of the motor output shaft is transmitted to the carriage driving gear. For ensuring that the ball bearings 12 on carriage member 11 will always be in engagement with the template surface, and thus eliminate any frictional engagement between carriage and template, shaft 25, 26, 27 is constantly maintained in tension by a tension coil spring 26a mounted on it and connected at one end to shaft 25, and at the other end to shaft 27.

Operation of this form of the invention is as follows:

The devices 1 are positioned at either side of the underframe end casting tailpiece T with the template slots in proper alignment with the end of the tailpiece for producing the cut where desired. The torches are lighted, and by manually adjusting wheel 23 and the cooperating rack and pinion, the torches are properly spaced from the work in accordance with usual oxy-acetylene cutting practice. The motor is turned on and through its gear box 31, output shaft 30, universal joint 29, variable-length shaft 25, 26, 27, universal joint 28, and carriage drive shaft 13, carriage driving gear 16 is rotated, thereby causing the carriage to move upwardly in the slot 7 in template 4, the position of the carriage in the slot being fixed, of course, by roller 15 which, on the inclined portions of the slot, rests on the lower wall of the slot, thereby supporting the carriage during movement. As the carriage, and with it, the torch move along the slot, the shape of the slot center line is cut on the tailpiece side wall. When the cutting is completed and the carriage reaches the upper end of the slot, the motor is turned off and the carriage is permitted to remain in the upper position until used on another workpiece, at which time the motor is merely reversed and the carriage is operated in a downward, rather than an upward, direction.

The second embodiment of my invention, generally indicated on Figure 1 by the numeral 35, is for the purpose of cutting contoured pads on the ends of bolster B. The surfaces of these pads are substantially horizontal and are stepped, the risers being slightly inclined inwardly. As best seen in Figures 7–10, device 35 includes a T-shaped horizontal base 36. At the ends of the portion of base member 36 conforming to the T cross bar are secured, by angle brackets 37, a pair of parallel upstanding slotted templates 38, the contour of the slots 39 corresponding to the contour of the surfaces of the cut on the bolster ends. Torches 40 are mounted on brackets 41 extending inwardly of the templates from each carriage 42. Each of the carriages 42 is supported on the templates by a shaft 43 which passes through slots 39 and which mounts a pair of spaced discs 44 on either side of the template, shaft 43 being of slightly less diameter than the width of the slot, and discs 44 being of greater diameter than the slot and being separated from each other by a distance slightly greater than the thickness of the template so that the carriage is constantly retained against tilting relative to the template. Torches 40 are connected to carriage brackets 41 through a horizontal pivot member 45 extending parallel to the template surfaces whereby inclination of the torches can be regulated in accordance with the desired inclination of the workpiece surfaces to be cut.

For moving the carriages in the template slot, they are each connected by means of shaft 43 to a pair of parallel bars 46, one on each side of the template, which are secured at their other ends to a T-section member 47, the entire assembly forming a yoke suitably braced at the intersections of members 46 and 47 by diagonal braces 48. Yoke 46, 47, 48 is formed with a centrally located tongue or handle 49, to which it is suitably braced as at 50, and on the lower surface of member 49 is secured a downwardly facing toothed rack 51, the latter meshing with and resting on a gear 52, which is operatively connected through a crown gear clutch 53, of substantially conventional construction, to the output shaft 55 of a reduction gear box 56 associated with variable speed electric motor 57, the motor 57 being supported on structure 58 extending upwardly from and secured to the end portion of base plate 36. The shaft 54 supporting gear 52 is similarly supported on base plate 36 by a pair of upstanding parallel bearing plates 59. The usual oxygen and acetylene lines 60 and 61 respectively are connected and feed into the usual mixing chamber 62, which is supported by a member 63, also supported on base plate 36, and the mixing chamber is connected to the torches by suitable hose and pipe connections 64.

Operation of the torches follows usual oxy-acetylene practice, and the cutting is accomplished by starting the motor, engaging clutch 53 so that gear 52 commences to rotate thereby causing meshing rack 51, and with it tongue 49 and yoke 46, 47, 48 to move in a direction parallel to the planes of the templates 38, thereby causing torches 40 to form a locus coinciding with the center line of template slots 39. This, of course, results in the formation on the bolster ends of surfaces conforming in contour to the center line of the template slots.

The details of the apparatus may be varied substantially without departing from the spirit of the invention and the exclusive use of those modifications coming within the scope of the appended claims is contemplated.

What is claimed is:

1. Apparatus for cutting metal workpieces comprising a horizontal support for positioning adjacent and in fixed relation to a workpiece, a template mounted in upstanding position on said support, said template being formed with a narrow elongate slot conforming in shape to the desired cut, a carriage assembly including a drive shaft projecting through said slot and having antifriction means journalled thereon disposed within said slot and normally engaging one side wall thereof, said antifriction means being of a diameter just slightly less than the width of said slot for guiding and supporting said carriage assembly in the slot, a rack extending along one edge of said slot, said carriage assembly also including a driving gear fixed to said drive shaft and engaged with said rack, a circular retainer fixed to said drive shaft adjacent said drive gear and being of a greater diameter than such gear and engaging one side of said rack, a member journalled on said shaft on the side of said template opposite said rack and being of a greater diameter than the width of said slot such that said circular retainer and said member sandwich the template and rack therebetween to support the carriage assembly solely upon the template, a cutting torch, means mounting said cutting torch upon said member, and means for rotating said drive shaft to move said carriage assembly along said rack within the confines of said slot.

2. The assembly as defined in and by claim 1 wherein said means mounting the cutting torch upon the member comprises a plurality of rods fixed to said member and projecting laterally therefrom, said cutting torch being slidably engaged upon said rods.

3. The assembly as defined in and by claim 1 wherein said means for rotating the drive shaft comprises a motor mounted on said support, a flexible and extensible shaft connecting said motor and said drive shaft, and spring means normally urging said flexible and extensible shaft toward a collapsed position to urge said member toward its corresponding face of the template to assure a perpendicular relation between said drive shaft and the template.

References Cited in the file of this patent

UNITED STATES PATENTS

| | | |
|---|---|---|
| 1,431,650 | Godfrey | Oct. 10, 1922 |
| 1,668,085 | Orzel | May 1, 1928 |
| 1,853,026 | Anderson | Apr. 12, 1932 |
| 2,305,167 | Kasper | Dec. 15, 1942 |
| 2,474,406 | Tillett et al. | June 28, 1949 |
| 2,508,730 | Stone | May 23, 1950 |

FOREIGN PATENTS

| | | |
|---|---|---|
| 334,815 | Great Britain | Sept. 11, 1930 |
| 120,298 | Australia | Aug. 30, 1945 |
| 589,742 | Great Britain | June 27, 1947 |